(12) United States Patent
Töller et al.

(10) Patent No.: US 12,319,217 B2
(45) Date of Patent: Jun. 3, 2025

(54) BUMPER CROSSBEAM FOR A MOTOR VEHICLE

(71) Applicant: Kirchhoff Automotive Deutschland GmbH, Attendorn (DE)

(72) Inventors: Marco Töller, Cologne (DE); Alexander Günther, Olpe (DE); Lena Kremer, Finnentrop (DE); Maria Schmitt, Attendorn (DE)

(73) Assignee: Kirchhoff Automotive Deutschland GmbH, Attendorn (DE)

( * ) Notice: Subject to any disclaimer, the term of this patent is extended or adjusted under 35 U.S.C. 154(b) by 562 days.

(21) Appl. No.: 17/639,970

(22) PCT Filed: Sep. 3, 2020

(86) PCT No.: PCT/EP2020/074585
§ 371 (c)(1),
(2) Date: Mar. 3, 2022

(87) PCT Pub. No.: WO2021/043896
PCT Pub. Date: Mar. 11, 2021

(65) Prior Publication Data
US 2022/0314912 A1     Oct. 6, 2022

(30) Foreign Application Priority Data

Sep. 6, 2019  (DE) .................... 10 2019 124 019.0
Sep. 6, 2019  (DE) .................... 10 2019 124 020.4

(51) Int. Cl.
*B60R 19/34*    (2006.01)
*B60R 19/02*    (2006.01)
*B60R 19/18*    (2006.01)

(52) U.S. Cl.
CPC ............ *B60R 19/34* (2013.01); *B60R 19/023* (2013.01); *B60R 19/18* (2013.01); *B60R 2019/1813* (2013.01)

(58) Field of Classification Search
CPC . B60R 2019/247; B60R 19/34; B60R 19/023; B60R 19/18; B60R 2019/1813;
(Continued)

(56) References Cited

U.S. PATENT DOCUMENTS 6,520,552 B2 *  2/2003   Schroter ................. B60R 19/34
                                                          293/121
8,950,794 B2     2/2015   Lenkenhoff et al.
(Continued)

FOREIGN PATENT DOCUMENTS

CN     208180972 U  * 12/2018
DE       19517922 A1   11/1996
(Continued)

OTHER PUBLICATIONS

CN-208180972-U computer translation (Year: 2018).*
(Continued)

*Primary Examiner* — Jason S Daniels
(74) *Attorney, Agent, or Firm* — Polson Intellectual Property Law P.C.; Margaret Polson; Christopher Sylvain

(57) ABSTRACT

A bumper cross member for a motor vehicle, having a crossmember extending transversely to the longitudinal axis of the vehicle, and two crashboxes connected thereto and designed as hollow chamber sections. Each crashbox is connected with its end facing away from the vehicle to the crossmember in a respective end section thereof, and may be connected, with its end facing the vehicle, to a structural component of the vehicle. The crashboxes are supported with their end faces only in sections on the rear side of the crossmember, in particular such that the support is continu- (Continued)

ous or at least substantially continuous either in the upper and lower end-face areas, or in the two lateral end-face areas, while support of the other end-face areas is provided only in sections or absent. The distance between the end-face areas of the crashboxes, which are unsupported on the crossmember, is set from the rear side of the crossmember, such that only after a first phase of energy absorption with deformation of the crashbox is the end face facing the crossmember supported over its whole surface on the rear side of the crossmember.

17 Claims, 2 Drawing Sheets

(58) Field of Classification Search
CPC .. B60R 19/24; B60R 2019/1806; B60D 1/565
See application file for complete search history.

(56) References Cited

U.S. PATENT DOCUMENTS

| | | | |
|---|---|---|---|
| 9,446,799 | B2 | 9/2016 | Franzpötter |
| 9,598,100 | B2 | 3/2017 | Lenkenhoff |
| 9,764,764 | B2 | 9/2017 | Irle |
| 10,005,495 | B2 | 6/2018 | Töller |
| 10,577,025 | B2 | 3/2020 | Michler |
| 10,882,559 | B2 | 1/2021 | Gündogan |
| 11,142,248 | B2 | 10/2021 | Günther |
| 11,148,623 | B2 | 10/2021 | Günther |
| 11,235,720 | B2 | 2/2022 | Honing et al. |
| 11,292,409 | B2 | 4/2022 | Töller |
| 11,505,146 | B2 | 11/2022 | Weige |
| 2002/0153719 | A1 | 10/2002 | Taguchi |
| 2011/0291431 | A1* | 12/2011 | Buschsieweke ........ C22C 38/28 293/133 |
| 2017/0096171 | A1 | 4/2017 | Frost et al. |
| 2019/0344385 | A1 | 11/2019 | Töller |
| 2022/0009435 | A1 | 1/2022 | Gunther |
| 2022/0024399 | A1 | 1/2022 | Tlauka |
| 2022/0281532 | A1 | 9/2022 | Tentscher |
| 2022/0289304 | A1 | 9/2022 | Weige |
| 2022/0297524 | A1 | 9/2022 | Günther |
| 2022/0363211 | A1 | 11/2022 | Günther |

FOREIGN PATENT DOCUMENTS

| | | |
|---|---|---|
| DE | 19635285 A1 | 3/1997 |
| DE | 10346906 B3 | 5/2005 |
| DE | 102004008741 A1 | 7/2005 |
| DE | 102010013283 A1 | 9/2011 |
| DE | 102011052770 A1 | 2/2013 |
| DE | 102013100720 A1 | 7/2014 |
| EP | 1361082 A1 | 11/2003 |
| WO | 9703865 A1 | 2/1997 |
| WO | 2011075031 A1 | 6/2011 |
| WO | 2011123012 A1 | 10/2011 |
| WO | 2012158411 A1 | 11/2012 |
| WO | 2017044035 A1 | 3/2017 |
| WO | 2021018804 A1 | 2/2021 |
| WO | 2021043896 A1 | 3/2021 |

OTHER PUBLICATIONS

DE102011052770 computer translation (Year: 2013).*
Office action dated May 17, 2023 in related Chinese application 202080062256.9.
International Search Report dated Mar. 11, 2021 in parent International application PCT/EP2020/074585.
Written Opinion of the International Searching Authority dated Mar. 11, 2021 in parent International application PCT/ EP2020/074585. Note: Machine translation provided. Consult official WIPO translation if unclear.
Examination Report dated Sep. 11, 2020 in related German application DE 10 2019 124 019.0. Machine translation provided.
Pending U.S. Appl. No. 17/621,806, filed Dec. 22, 2021. Per rule 609.07.

* cited by examiner

BUMPER CROSSBEAM FOR A MOTOR VEHICLE

BACKGROUND

The present disclosure relates to a bumper crossmember for a motor vehicle with a crossmember extending transversely to the longitudinal axis of the vehicle and with two crashboxes designed as hollow chamber sections connected thereto, wherein each crashbox is connected, with its end facing away from the vehicle, to the crossmember in a respective end section to the crossmember, and may be connected, with its end facing toward the vehicle, to a structural component belonging to the vehicle, e.g., a longitudinal member.

A bumper crossmember acts to protect assemblies located on the vehicle side behind the bumper crossmember, as well as the passenger compartment in the event of a collision, in particular a head-on collision. The bumper crossmember has a crossmember, whose longitudinal extension is transverse to the direction of travel (x direction) of the vehicle, thus extending in the y direction. Energy absorption components, known as crashboxes, are connected to the crossmember at its two end sections. These are supported at the rear of the crossmember with their end pointing away from the vehicle. The other end of the crashbox points toward the vehicle and is connectable or connected to a structural component of the vehicle, typically a side member. Part of such a crashbox is in many cases a baseplate at its end facing the vehicle. The surface of such a baseplate extends beyond the lateral surface of the crashbox in the manner of a flange. Mounting openings are made therein in order to connect the bumper crossmember to the structural component on the vehicle side.

Crashboxes are used to absorb impact energy by defined reshaping thereof. Thus, the energy to be absorbed is converted into forming energy. Crashboxes can be made of an aluminum alloy suitable for this purpose, in that case typically as hollow chamber sections. Crashboxes may also be made of steel components, in that case typically by two half-shells adjoining each other with their longitudinal joints, and mostly U-shaped in cross-section. Steel crashboxes typically have structures that affect wrinkling, e.g., beads, or the like.

Regardless of the material and design of such a crashbox, the force acting thereon must exceed a certain initialization size for the desired deformation to occur along the length of the crashbox, while the application of force is sustained. In a force-displacement diagram showing the deformation behavior of such a crashbox in the case of energy absorption, this is noticeable in a clearly discernible initial peak. In the case of such a crashbox, the initial peak is sometimes reached only with a force that is greater than the force permissible for the respective application. For this reason, attempts have been made to reduce the height of such an initial peak, and thus the required initialization force, by having the crashbox in longitudinal extension have areas which require different energy for deformation. For example, such a crashbox, at its initial section adjacent to the crossmember of such a bumper crossmember, may be designed with a wall thickness that is smaller than in the adjoining areas in the direction of the vehicle. Due to the reduced wall thickness, the height of such an initial peak is naturally reduced. It is also possible to adjust areas of such a crashbox with a lower strength by selective heating, such that the deformation begins in these areas and, due to the lower strength in this section, only a lower force needs to be applied in order to overcome the initial peak.

However, these previously known measures require either an elaborate design of the crashboxes or additional process steps.

SUMMARY

Proceeding from this background, an aspect of the present disclosure is based on further designing a generic bumper crossmember of the type mentioned at the outset, such that the bumper crossmember has an initial energy absorption peak which is reduced in terms of its height, without any special steps affecting the strength properties of such a crashbox.

This is provided according to the present disclosure by a generic bumper crossmember of the type mentioned at the outset, in which the crashboxes are supported with their end faces only in sections on the rear side of the crossmember, in particular, such that the support is continuous or at least substantially continuous either in the upper and lower end-face areas or in the two lateral end-face areas, while support of the respective other end-face areas is provided only in sections or is absent, wherein the distance of the end-face areas of the crashboxes, which are not supported on the rear side of the crossmember, from the rear side of the crossmember being set such that only after a first phase of energy absorption with deformation of the crashbox will the end face, which faces the crossmember, be fully supported on the rear side of the crossmember.

In this bumper crossmember, the crashboxes are only supported in sections on the rear of the crossmember with their end faces facing the crossmember. As a result of this support, which is only provided in sections, force is initially introduced from the crossmember into the end face of such a crashbox, which faces the crossmember, only in those sections of the end face which are supported on the rear side of the crossmember. Such an introduction of energy to be absorbed, initially only in sections with respect to the circumferential extent of the end face of such a crashbox, leads to a concentration of force on the supported end face areas, such that in a first phase of deformation, only the sections of the crashbox adjacent to the supported end-face areas are deformed. Thus, in this first phase of energy absorption, the energy is not introduced circumferentially into the end face of the crashbox facing the crossmember. After deformation in the supported end-face areas, the initially unsupported end-face areas also bear against the rear of the crossmember, such that force is then introduced circumferentially into the crashbox. Due to this special cause-effect relationship, the initial peak in a force-displacement diagram can be significantly reduced. Such a support arrangement can be adjusted by appropriately contouring the end face of the crashbox facing the crossmember.

The end face of such a crashbox facing the crossmember is supported in the same way in the end-face areas opposite one another in the z and y directions. Either the upper and lower end-face areas or the two lateral end-face areas are supported continuously or at least substantially continuously on the rear side of the crossmember. Depending on the design of the bumper crossmember, the respective other pair of surfaces or end-face areas is only supported in sections on the rear side of the crossmember, or not at all. A special feature of the bumper crossmember design is that the deformation initialization force defining the initial peak can be influenced by the degree of support in the end-face areas, which are not continuously or at least substantially not continuously supported. Thus, in providing a longer or shorter support length, a corresponding influence can be exerted simply by appropriate contouring of the end face of such a crashbox facing the crossmember.

In the case of such a bumper crossmember, since in principle no additional process steps have to be performed for its manufacture and no special crashboxes have to be used, the manufacturing costs are not increased compared with conventional connections of a crashbox to the crossmember of a bumper crossmember, or at least are not significantly greater. The contouring of the end face of such a crashbox facing the crossmember can, if it is composed of two press-formed half-shells, already be performed when the blanks are punched or cut out from a sheet of metal.

According to one embodiment of such a bumper crossmember, the upper and lower end-face areas of each of the two crashboxes are continuous or at least substantially continuous. The two lateral end-face areas pointing in the y direction are only supported in sections, if at all, on the crossmember.

The above-described support of the crashboxes on the crossmember may also be implemented for crossmembers having a corrugated structure aligned in the vertical direction (z direction). Such crossmembers are also sometimes used, as their corrugated structure affords them greater rigidity. The alignment of the corrugated structure in the vertical direction requires that the corrugated structure comprises the following vertex structures along the longitudinal extension of the crossmember, specifically at least three vertex structures in the same direction, i.e., three vertex structures pointing in the same direction. Two adjacent vertex structures are each connected to one another by a flank, which is inclined relative to a horizontal. According to one embodiment, in such a crossmember, the upper and lower end-face portions of each crashbox are supported on such a flank, and preferably on a flank pointing or facing in the vertical direction. In such a design, the upper flank, on which the upper end-face area is supported, points upward in the vertical direction. The lower flank, on which the lower end-face area is supported, points downward in the vertical direction. In such a design, the upper and lower end-face areas supported on the flanks pointing in the vertical direction are easily accessible in order to connect the crashbox to the rear of the crossmember along these supported end-face areas in a material-locking manner, typically by welding the two parts together. Preferably, the lateral end-face areas of the crashboxes carry a support lug projecting toward the rear of the crossmember. The support lug engages in a vertex structure located between the two outer vertex structures. In this vertex structure, however, the support lug is only supported on the two mutually-facing flanks, with which this central vertex structure is connected to the two outer vertex structures. The deformation behavior in the first phase of a deformation process can be influenced depending on the length of the contact surface of such a support lug with such a flank of the crossmember. Thus, with such a design of the bumper crossmember, at least the vertex structures facing the crashbox are not supported on the end face of the crashbox. Support in the unsupported end-face areas of the crashbox takes place after an initial deformation phase, provided deformation in the crashbox was already initialized via the supported end-face areas.

The directional indications used in this context, i.e., the x direction, y direction and z direction, are the directional indications normally used in a vehicle. The x direction represents the longitudinal extension of the vehicle. The y direction is the transverse extension of the vehicle in the direction of its width. The z direction is the vertical direction.

BRIEF DESCRIPTION OF THE DRAWINGS

The following description is provided by way of an example embodiment with reference to the accompanying drawings, wherein.

DETAILED DESCRIPTION

Figure 1:
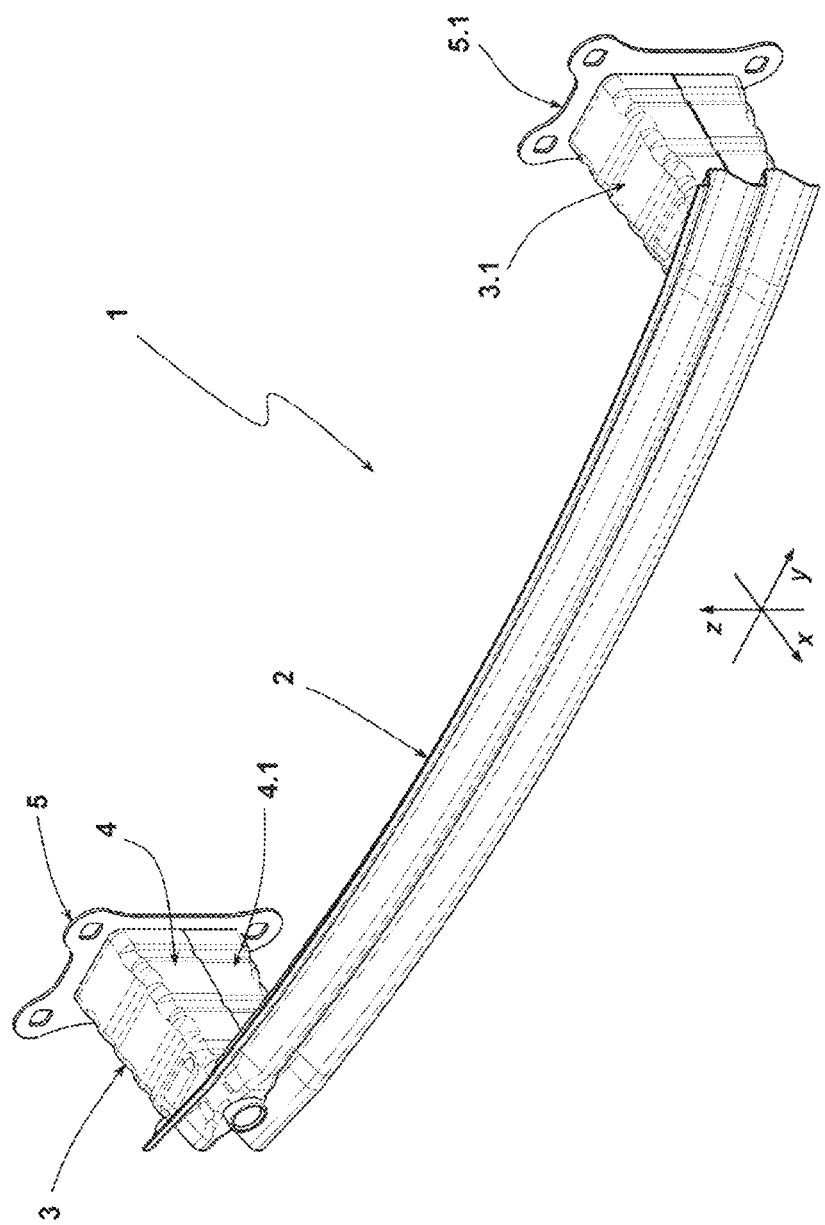
FIG. 1 shows a perspective view of a bumper crossmember.

With reference to FIG. 1, a bumper crossmember 1 comprises a crossmember 2 to which a crashbox 3, 3.1 is connected in the area of either end. The crossmember 2 of the bumper crossmember 1 has a corrugated structure aligned in the z direction. The profiling of the corrugated structure extends with its vertex structures in the longitudinal direction of the crossmember 2. The crossmember 2 is a press-formed steel component.

Crashbox 3—crashbox 3.1 is of identical design—is composed of two U-shaped half shells 4, 4.1, each press-formed from a steel blank. The two half shells 4, 4.1 adjoin one another with their longitudinal joints and are welded together at this point. At the end facing a vehicle not shown in the figures, the crashbox 3 carries a so-called baseplate 5, with which the bumper crossmember 1 is connected to a vehicle side member in the embodiment shown.

Figure 2:
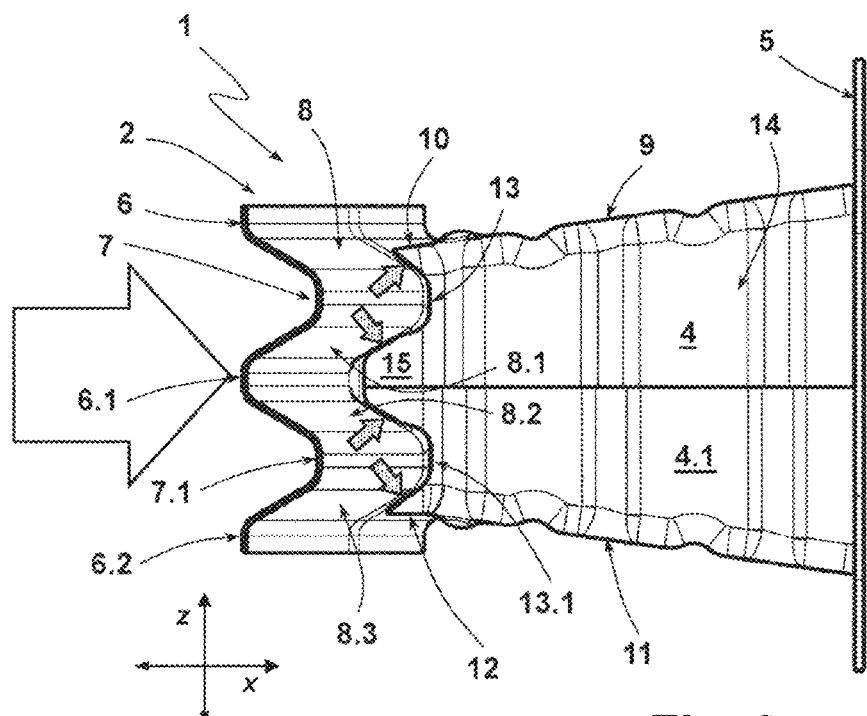
FIG. 2 shows a cross-sectional view through the bumper crossmember of FIG. 1 with a line of intersection at the center of its longitudinal extension, as viewed in the direction toward the left end shown in FIG. 1.

Due to the profiling of the crossmember 2 in the vertical direction, as shown in FIG. 1, the end face of the crashbox 3 facing the rear of the crossmember 2 is also profiled accordingly, as can be seen in FIG. 2.

As is seen more clearly in FIG. 2, the corrugated structure of the crossmember 2 has three positive vertex structures 6, 6.1, 6.2 facing away from the vehicle, as well as two intermediate negative vertex structures 7, 7.1 in the form of recesses opposite the positive vertex structures 6, 6.1, 6.2. In the direction toward the crashbox 3, the negative vertex structures 7, 7.1 represent the positive vertex structures, and the vertex structures 6, 6.1, 6.2 represent the negative vertex structures, in that these recede with in relation to the vertex structures 7, 7.1. Adjacent vertex structures are connected to one another by means of a flank 8, 8.1, 8.2, 8.3, respectively. These flanks 8, 8.1, 8.2, 8.3 are inclined relative to the horizontal at about 30 degrees in the embodiment shown.

The contouring of the end face of the crashbox 3 facing the crossmember 2 is designed, such that the upper end-face area 10 provided by the upper wall 9 and the lower end-face area 12 provided by the lower wall 11 are each supported over their extension in the y direction on a flank 8, 8.3 facing in the vertical direction and joined to the latter by a welded joint. The area of support of the upper and lower end-face areas 10, 12 on the flank 8 and 8.3, respectively, is indicated in FIG. 2 by a block arrow. In contrast, the vertex structure 7, 7.1 facing the crashbox 3 is not supported on the complementary contour 13, 13.1 in the end-face design of the crashbox 3.

The two side walls 14 of the crashbox 3, of which only the side wall 14 is visible in FIG. 1, carry a support lug 15 projecting in the direction of the longitudinal extension of the crashbox 3 in the direction of the crossmember 2. This support lug 15 engages in the negative vertex structure 6.1 located between the vertex structures 7, 7.1 when viewed from the direction of the crashbox 3. With regard to its outline geometry, which is visible in FIG. 2, the support bracket 15 is designed, such that it is supported only on the inclined flanks 8.1, 8.2 facing one another. Each of these support areas are also indicated by a block arrow. The vertex of the support lug 15 facing the crossmember 2 is in turn spaced apart from the vertex structure 6.1.

In the case of impact energy absorption, as indicated by the block arrow in FIG. 2, the impact energy is initially introduced in the crashbox 3 only in the end-face areas located on the flanks 8, 8.1, 8.2, 8.3. Only when the end-face areas supported directly on the rear of the crossmember 2 have begun to deform, i.e., are deformed in the direction of the base plate 5, do the vertex structures 6.1, 7, 7.1 come into contact with the complementary geometries 13, 13.1, as well as the vertex of the support bracket 15, with their sides facing the crashbox 3. Only then, the crashbox 3 becomes deformed over its whole cross-sectional area facing the crossmember 2 for further energy absorption.

The design of the crashbox 3 support shown in FIG. 2 with its end facing away from the vehicle at the rear of the crossmember 2 indicates that the distance between the vertex structures 7, 7.1 to the complementary geometries 13, 13.1 of the crashbox 3 is less than the distance of the vertex of the support lug 15 to the vertex structure 6.1. Thus, an initial application of force until an application of force over the whole cross-sectional area of the crashbox is devised in three stages from the crossmember 2 to the crashbox 3. While at the beginning of a first deformation phase, energy is only applied to the crashbox 3 via the upper and lower end-face areas 10, 12, after the first deformation phase of the crashbox 3, the vertices 7, 7.1 come into contact against the complementary geometries 13, 13.1 of the crashbox 3, such that these support areas are also included in the further deformation. Only after further deformation does the side of the vertex structure 6.1 facing the crashbox 3 come into contact with the vertex of the support bracket 15. Subsequently, a force is applied to the crashbox 3 over its whole cross-sectional geometry.

Figure 3:
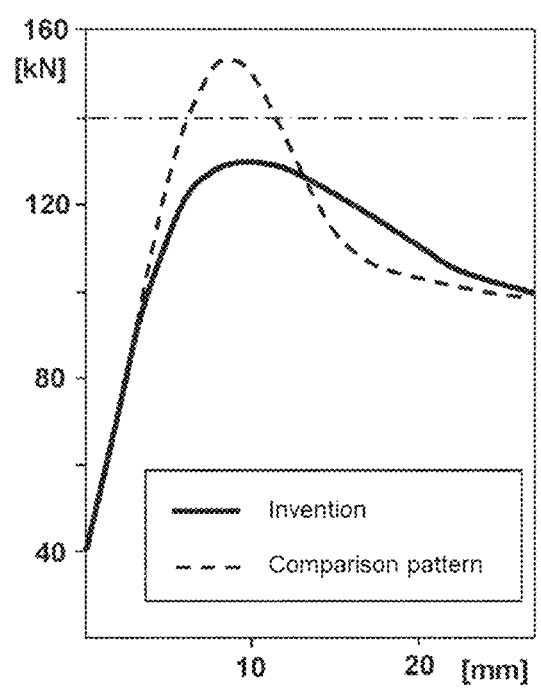
FIG. 3 is a force-displacement diagram showing the initial deformation behavior of the bumper crossmember.

The above-described design of the bumper crossmember 1 results in a clearly reduced initial peak, if the deformation behavior described above is plotted in a force-displacement diagram. One such diagram is shown in FIG. 3 with respect to the bumper crossmember 1. This shows the deformation behavior in the area of the crashbox 3. In the embodiment shown in the figures, the objective was that a maximum force of 140 kN should not be exceeded. This objective was achieved due to the special design of the support of the crashboxes 3, 3.1 on the rear side of the crossmember 2.

The curve (solid line) showing the deformation behavior of the crashbox 3 connected to the rear of the crossmember 2 is contrasted with a curve (dashed line) showing the deformation of a crashbox when it is supported on this crossmember over its whole end face facing the rear of said crossmember. The force required for initial deformation in a bumper crossmember designed in this way is substantially above the force of 140 kN permitted for the described case. The initial peak is concisely formed in this embodiment.

The invention has been described with reference to example embodiments. The described support arrangement of the crashboxes on the crossmember may also be realized, e.g., if the crossmember has a cap-shaped cross-sectional profile, especially if the legs are inclined toward one another, whereby the hollow chamber opens further away from the crashbox. The web of the crossmember connecting the flanks is spaced apart at least in some areas from the end face of the crashbox in the area of its side walls. Thus, the top and bottom face areas of the crashbox are connected to these flanks.

For a person skilled in the art, there are numerous further options for implementing the invention, without these needing to be explained or shown in detail in the context of the present disclosure.

REFERENCE NUMERAL LIST

1 Bumper crossmember
2 Crossmember
3, 3.1 Crashbox
4, 4.1 Half shell
5 Baseplate
6, 6.1, 6.2 Vertex structure
7, 7.1 Vertex structure
8, 8.1, 8.2, 8.3 Flank
9 Wall
10 Upper end-face area
11 Wall
12 Lower end-face area
13, 13.1 Complementary contour
14 Side wall
15 Support lug

The invention claimed is:

1. A bumper crossmember for a motor vehicle, wherein an x-direction corresponds to a longitudinal extension of the vehicle, a y-direction corresponds to a transverse extension of the vehicle, and a z-direction corresponds to a vertical direction, the bumper crossmember comprising:
   a crossmember extending in the y-direction and two crashboxes connected thereto in respective end sections of the crossmember, wherein each crashbox has an end connected to the crossmember and an opposite end configured to be connected to a structural component of the vehicle, and wherein, on the end connected to the crossmember, each crashbox has an end face facing the crossmember with an upper end-face area, a lower end-face area, and two lateral end-face areas,
   wherein the crashboxes are supported with the end faces thereof only in sections on a rear side of the crossmember, such that support is continuous or at least substantially continuous either in the upper and lower end-face areas or in the two lateral end-face areas, while support of the respective other end-face areas is absent or provided only in sections, and wherein the end-face areas of the crashboxes not supported on the rear side of the crossmember are positioned from the rear side of the crossmember such that each end face is fully supported on the rear side of the crossmember only after a first phase of energy absorption with deformation of the respective crashbox,
   wherein the upper and lower end-face areas of the crashboxes are continuously or at least substantially continuously supported on the rear side of the crossmember, while the two lateral end-face areas are unsupported or supported only in sections on the rear side of the crossmember.

2. The bumper crossmember of claim 1, wherein each crashbox is composed of two U-shaped half shells adjoining one another along longitudinal joints thereof.

3. The bumper crossmember of claim 2, wherein the half shells are press-formed parts made from steel blanks.

4. The bumper crossmember of claim 1, wherein the crashboxes have a quadrangular cross-sectional geometry.

5. The bumper crossmember of claim 4, wherein the crashboxes have a square cross-sectional geometry with rounded edges.

6. The bumper crossmember of claim 1, wherein the crossmember has a corrugated structure aligned in the z-direction, wherein the corrugated structure comprises at least three vertex structures following the longitudinal extension of the crossmember, wherein two vertex structures adjacent in the z-direction are connected to one another by a flank of the corrugated structure inclined relative to a horizontal, and wherein the upper and lower end-face areas of each crashbox are supported continuously or at least substantially continuously on respective flanks of the corrugated structure.

7. The bumper crossmember of claim 6, wherein the upper end-face area is supported on an upper flank which faces upward in the z-direction, and the lower end-face area is supported on a lower flank which faces downward in the z-direction.

8. The bumper crossmember of claim 7, wherein the lateral end-face areas of the crashboxes each carry a support lug which projects toward the rear side of the crossmember and which is supported only on two flanks of the corrugated structure facing one another, and wherein the two flanks connect a central vertex structure to respective adjacent vertex structures of the corrugated structure.

9. The bumper crossmember of claim 1, wherein the crashboxes are connected to the crossmember by joining only along their continuous or at least substantially continuous support.

10. A bumper crossmember for a motor vehicle, wherein an x-direction corresponds to a longitudinal extension of the vehicle, a y-direction corresponds to a transverse extension of the vehicle, and a z-direction corresponds to a vertical direction, the bumper crossmember comprising:
a crossmember extending in the y-direction and two crashboxes connected thereto in respective end sections of the crossmember, wherein each crashbox has an end connected to the crossmember and an opposite end configured to be connected to a structural component of the vehicle, and wherein, on the end connected to the crossmember, each crashbox has an end face facing the crossmember with an upper end-face area, a lower end-face area, and two lateral end-face areas,
wherein the crashboxes are supported with the end faces thereof only in sections on a rear side of the crossmember, such that support is continuous or at least substantially continuous either in the upper and lower end-face areas or in the two lateral end-face areas, while support of the respective other end-face areas is absent or provided only in sections, and wherein the end-face areas of the crashboxes not supported on the rear side of the crossmember are positioned from the rear side of the crossmember such that each end face is fully supported on the rear side of the crossmember only after a first phase of energy absorption with deformation of the respective crashbox,
wherein the crossmember has a corrugated structure aligned in the z-direction, wherein the corrugated structure comprises at least three vertex structures following the longitudinal extension of the crossmember, wherein two vertex structures adjacent in the z-direction are connected to one another by a flank of the corrugated structure inclined relative to a horizontal, and wherein the upper and lower end-face areas of each crashbox are supported continuously or at least substantially continuously on respective flanks of the corrugated structure.

11. The bumper crossmember of claim 10, wherein each crashbox is composed of two U-shaped half shells adjoining one another along longitudinal joints thereof.

12. The bumper crossmember of claim 11, wherein the half shells are press-formed parts made from steel blanks.

13. The bumper crossmember of claim 10, wherein the crashboxes have a quadrangular cross-sectional geometry.

14. The bumper crossmember of claim 13, wherein the crashboxes have a square cross-sectional geometry with rounded edges.

15. The bumper crossmember of claim 10, wherein the upper end-face area is supported on an upper flank which faces upward in the z-direction, and the lower end-face area is supported on a lower flank which faces downward in the z-direction.

16. The bumper crossmember of claim 15, wherein the lateral end-face areas of the crashboxes each carry a support lug which projects toward the rear side of the crossmember and which is supported only on two flanks of the corrugated structure facing one another, and wherein the two flanks connect a central vertex structure to respective adjacent vertex structures of the corrugated structure.

17. The bumper crossmember of claim 10, wherein the crashboxes are connected to the crossmember by joining only along their continuous or at least substantially continuous support.

* * * * *